United States Patent
Kim

(10) Patent No.: US 11,467,798 B2
(45) Date of Patent: Oct. 11, 2022

(54) DISPLAY APPARATUS FOR CHANGING AN ADVERTISEMENT AREA, SERVER, ELECTRONIC APPARATUS AND CONTROL METHODS THEREOF

(71) Applicant: SAMSUNG ELECTRONICS CO., LTD., Suwon-si (KR)

(72) Inventor: Kyunghoon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/688,340

(22) Filed: Nov. 19, 2019

(65) Prior Publication Data

US 2020/0159480 A1    May 21, 2020

(30) Foreign Application Priority Data

Nov. 19, 2018  (KR) .......................... 10-2018-0142853

(51) Int. Cl.
*G06F 3/147*    (2006.01)
*G09F 9/30*     (2006.01)

(52) U.S. Cl.
CPC ............... *G06F 3/147* (2013.01); *G09F 9/30* (2013.01)

(58) Field of Classification Search
CPC .. G06F 3/147; G09F 9/30; G09F 5/14; G09G 2380/06; G09G 2340/0435
See application file for complete search history.

(56) References Cited

U.S. PATENT DOCUMENTS

| | | | |
|---|---|---|---|
| 9,646,387 B2 * | 5/2017 | Schwartz | .................. G06T 7/20 |
| 9,798,143 B2 | 10/2017 | Fujimaki et al. | |
| 9,814,977 B2 | 11/2017 | Stafford et al. | |
| 10,863,224 B2 * | 12/2020 | Gilley | ................. G06Q 30/0206 |
| 2013/0311308 A1 * | 11/2013 | Huang | ............... G06Q 30/0275 |
| | | | 705/14.73 |
| 2014/0098076 A1 * | 4/2014 | Yoon | ........................ G09G 3/20 |
| | | | 345/204 |
| 2016/0041388 A1 | 2/2016 | Fujimaki et al. | |
| 2016/0231411 A1 * | 8/2016 | Kumar | ............... G06K 9/00771 |
| 2016/0360288 A1 | 12/2016 | Mandyam et al. | |
| 2017/0053620 A1 * | 2/2017 | Law | ......................... G06T 1/20 |
| 2017/0094370 A1 | 3/2017 | Jankowski | |

(Continued)

FOREIGN PATENT DOCUMENTS

| | | |
|---|---|---|
| CN | 107071322 A | 8/2017 |
| JP | 2013-34237 A | 2/2013 |

(Continued)

OTHER PUBLICATIONS

International Search Report dated Mar. 9, 2020 issued by the International Searching Authority in International Application No. PCT/KR2019/015780.

(Continued)

*Primary Examiner* — Jennifer Mehmood
*Assistant Examiner* — Donna J. Ricks
(74) *Attorney, Agent, or Firm* — Sughrue Mion, PLLC

(57) ABSTRACT

A display apparatus obtains a plurality of content frames based on a content of a predetermined type, and controls a display to display the plurality of content frames and a plurality of identification frames including a predetermined image, the predetermined image identifying an area that corresponds to the display in a photographed image including the display.

11 Claims, 16 Drawing Sheets

(56) References Cited

U.S. PATENT DOCUMENTS

2017/0201793 A1 7/2017 Pereira et al.
2018/0082330 A1 3/2018 Koningstein

FOREIGN PATENT DOCUMENTS

| | | | | |
|---|---|---|---|---|
| JP | 2013034237 A | * | 2/2013 | ............... G06T 3/00 |
| JP | 2016039599 A | | 3/2016 | |
| JP | 2018-79617 A | | 5/2018 | |
| KR | 10-2015-0066009 A | | 6/2015 | |
| KR | 10-1580573 B1 | | 12/2015 | |
| KR | 10-2018-0017011 A | | 2/2018 | |
| KR | 10-2018-0096399 A | | 8/2018 | |
| WO | 2018138366 A1 | | 8/2018 | |

OTHER PUBLICATIONS

Written Opinion dated Mar. 9, 2020 issued by the International Searching Authority in International Application No. PCT/KR2019/015780.
Communication dated Sep. 21, 2021 by the European Patent Office in European Patent Application No. 19887208.7.
Communication dated Feb. 7, 2022 by the Intellectual Property India in Indian Patent Application No. 202117017239.

* cited by examiner

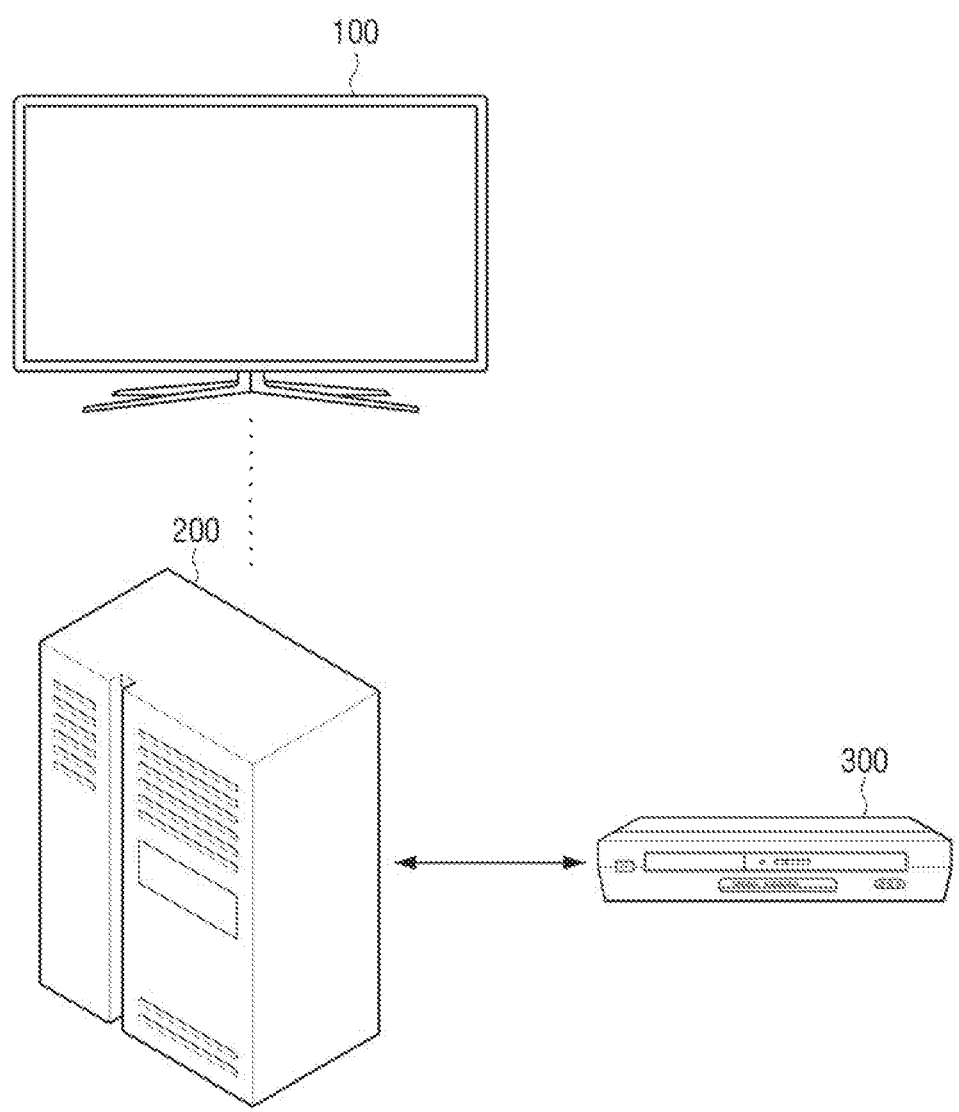

DISPLAY APPARATUS FOR CHANGING AN ADVERTISEMENT AREA, SERVER, ELECTRONIC APPARATUS AND CONTROL METHODS THEREOF

CROSS-REFERENCE TO RELATED APPLICATION

This application is based on and claims priority under 35 U.S.C. § 119 from Korean Patent Application No. 10-2018-0142853, filed on Nov. 19, 2018, in the Korean Intellectual Property Office, the disclosure of which is incorporated by reference herein in its entirety.

BACKGROUND

1. Field

The disclosure relates to a display apparatus, a server, an electronic apparatus, and control methods thereof. More specifically, the disclosure relates to a display apparatus for changing an advertisement area in a content to another advertisement, a server, an electronic apparatus, and control methods thereof.

2. Description of Related Art

Recent development in electronic technologies has enabled various types of content to be provided. In particular, it is possible to identify an advertisement signboard from an image in which the advertisement signboard or the like appears, replace the advertisement signboard with other content, and provide the same.

In general, processing of an entire image is required to identify a signboard, or the like, from a photographed image, and such image processing requires high performance hardware processing. Nevertheless, accurate identification of an area in an image may still be difficult, and therefore areas mistakenly identified as including an advertisement area, which should not be replaced, may be erroneously replaced with other content.

SUMMARY

Various example embodiments of the disclosure address the above disadvantages and other disadvantages not described above.

An objective of the disclosure is to provide a display apparatus for more accurately identifying an advertisement area in a content, a server, an electronic apparatus, and controlling methods thereof.

According to an embodiment, an display apparatus may include a communicator, a display and a processor to receive a content signal through the communicator, obtain a plurality of content frames based on the received content signal, and control the display to display the plurality of content frames, the processor is further configured to identify a type of the plurality of content frames, and control the display to display a set of content frames, identified as a predetermined type from among the plurality of content frames, and a plurality of identification frames including a predetermined image for identifying the set of content frames, and the predetermined image may be an image for identifying an area that corresponds to the display in a photographed image including the display.

The processor may change a scanning speed of the display based on a frame rate of the content and a number of the plurality of identification frames.

The processor may insert each of the plurality of identification frames between the set of content frames with a predetermined interval.

The processor may place a first content frame among the set of content frames right after an initially identified frame among the plurality of identification frames, and place a last content frame among the set of content frames just before a last identification frame among the plurality of identification frames.

The processor may control the display to display the set of content frames and the plurality of identification frames by placing at least one content frame among the set of content frames between a first identification frame including a first image and a second identification frame including a second image.

The processor may change a part of content frames among the set of content frames to an identification frame including the predetermined image.

The processor may change the part of content frames to the identification frame including the predetermined image by changing a pixel value of a predetermined area from each of the part of content frames.

The processor may determine the number of a plurality of identification frames including the predetermined image based on a frame rate of the content.

The predetermined type may correspond an advertisement content frame.

According to an embodiment, a server includes a memory storing a photographed content in which a display apparatus is photographed, and a processor to identify a predetermined image from a plurality of photographed frames included in the photographed content, and obtain first information that indicates an area corresponding to a display of the display apparatus and second information that indicating a point of time when a predetermined type content is displayed in the display apparatus based on the predetermined image.

The processor may change an area corresponding to the display in at least one photographed frame among the plurality of photographed frames based on the first information and the second information.

The processor may identify a plurality of predetermined images in the plurality of photographed frames, and obtain the second information based on a predetermined image that is identified initially and a predetermined image that is identified lastly among the plurality of predetermined images.

The server may further include a communication interface, and the processor may control the communication interface to transmit the photographed content, the first information, and the second information to an electronic apparatus.

The predetermined image may be included in a plurality of identification frames, and at least one content frame among a plurality of content frames included in the content of the predetermined type may be displayed while being disposed between the plurality of identification frames.

According to an embodiment, an electronic apparatus includes a communication interface, and a processor to obtain, from a server, a photographed content, first information indicating an area corresponding to a display of a display apparatus included in the photographed content, and second information indicating a point of time when a predetermined type content is displayed in the display apparatus through the communication interface, and change an area corresponding to the display in at least one photographed frame among the plurality of photographed frames included in the photographed content based on the first information and the second information.

According to an embodiment, a control method of a display apparatus includes obtaining a plurality of content frames based on a content of a predetermined type, and by placing at least one content frame among the plurality of content frames between a plurality of identification frames including a predetermined image, displaying the plurality of content frames and the plurality of identification frames, and the predetermined image may be an image to identify an area that corresponds to the display in a photographed image including the display.

The control method may further include changing scanning speed of the display based on a frame rate of the content and a number of the plurality of identification frames.

The displaying may include inserting each of the plurality of identification frames between the plurality of content frames with a predetermined interval.

The displaying may include placing a first content frame among the plurality of content frames right after an initially identified frame among the plurality of identification frames, and placing a last content frame among the plurality of content frames just before a last identification frame among the plurality of identification frames.

The displaying may include displaying the plurality of content frames and the plurality of identification frames by placing at least one content frame among the plurality of content frames between a first identification frame including a first image and a second identification frame including a second image.

The control method may further include changing a part of content frames among the plurality of content frames to an identification frame including the predetermined image.

The changing may include changing a part of content frames to an identification frame including the predetermined image by changing a pixel value of a predetermined area from each of the part of frames.

The control method may further include determining the number of a plurality of identification frames including the predetermined image based on a frame rate of the content.

The predetermined type content may be an advertisement content.

According to an embodiment, a control method of a server includes identifying a predetermined image from a plurality of photographed frames included in the photographed content, and obtaining first information that indicates an area corresponding to a display of the display apparatus and second information that indicating a point of time when a predetermined type content is displayed in the display apparatus based on the predetermined image.

The control method may further include changing an area corresponding to the display in at least one photographed frame among the plurality of photographed frames based on the first information and the second information.

The identifying may include identifying a plurality of predetermined images in the plurality of photographed frames, and the obtaining comprises obtaining the second information based on a predetermined image that is identified initially and a predetermined image that is identified lastly among the plurality of predetermined images.

The control method may further include transmitting the photographed content, the first information, and the second information to an electronic apparatus 다.

The predetermined image may be included in a plurality of identification frames, and at least one content frame among a plurality of content frames included in the content of the predetermined type may be displayed while being disposed between the plurality of identification frames.

According to an embodiment, a control method of an electronic apparatus includes receiving, from a server, a photographed content, first information indicating an area corresponding to a display of a display apparatus included in the photographed content, and second information indicating a point of time when a predetermined type content is displayed in the display apparatus through the communication interface; and changing an area corresponding to the display in at least one photographed frame among the plurality of photographed frames included in the photographed content based on the first information and the second information.

According to various embodiments, by including and displaying an identification frame in a content by a display apparatus, it may be easy to identify an area corresponding to a display from a photographed content and a server or an electronic apparatus may change the identified area to another content.

BRIEF DESCRIPTION OF THE DRAWINGS

The above and/or other aspects, features, and advantages of certain embodiments of the disclosure will be more apparent from the following detailed description, taken in conjunction with the accompanying drawings, in which:

FIG. 1 is a view illustrating an electronic system according to an embodiment;

DETAILED DESCRIPTION

Figure 2A:
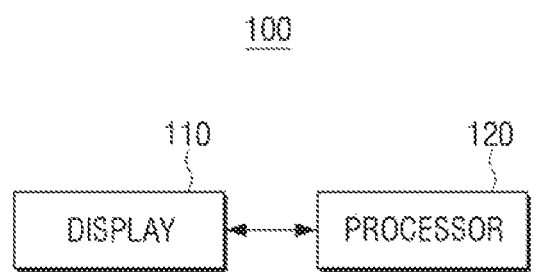
FIG. 2A is a block diagram illustrating a configuration of a display apparatus according to an embodiment.

The exemplary embodiments of the disclosure may be diversely modified. Accordingly, specific exemplary embodiments are illustrated in the drawings and are described in detail in this detailed description. However, it is to be understood that the disclosure is not limited to a specific exemplary embodiment, but includes all modifications, equivalents, and substitutions without departing from the scope and spirit of the disclosure. Also, well-known functions or constructions are not described in detail to avoid obscuring the disclosure with unnecessary detail.

Hereinafter, the disclosure will be further described with reference to the accompanying drawings.

The terms used in the present specification and the claims are general terms identified in consideration of the functions of the various embodiments of the disclosure. However, these terms may vary depending on intention, technical interpretation, emergence of new technologies, and the like of those skilled in the related art. Unless there is a specific definition of a term, the term may be construed based on the overall contents and technological understanding of those skilled in the related art.

In this specification, the expressions "have," "may have," "include," or "may include" or the like represent presence of a corresponding feature (for example: components such as numbers, functions, operations, or parts) and does not exclude the presence of additional feature.

The expression "At least one of A or/and B" should be understood to represent "A" or "B" or any one of "A and B."

As used herein, the terms "first," "second," or the like may denote various components, regardless of order and/or importance, and may be used to distinguish one component from another, and does not limit the components.

In addition, the description in the disclosure that one element (e.g., a first element) is "(operatively or communicatively) coupled with/to" or "connected to" another element (e.g., a second element) should be interpreted to include both the case that the one element is directly coupled to the another element, and the case that the one element is coupled to the another element through still another intervening element (e.g., a third element).

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part," and so on is used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

In this disclosure, a term user may refer to a person using an electronic apparatus or an apparatus (for example: artificial intelligence (AI) electronic apparatus) that uses an electronic apparatus.

Hereinafter, embodiments of the disclosure will be described in detail with reference to the accompanying drawings.

FIG. 1 is a view illustrating an electronic system 1000 according to an embodiment. The electronic system 1000 may include a display apparatus 100, a server 200, and an electronic apparatus 300.

The display apparatus 100 may be an apparatus that includes a display, such as a digital signage device, an electronic display, an advertisement panel, or the like, and directly displays a content through a display. The embodiment is not limited thereto, and the display apparatus 100 may be any device that includes a display, such as a desktop PC, a notebook, a smartphone, a tablet PC, a TV, an MP3 player, a portable media player (PMP), a cellular phone, smart glasses, a smart watch, a navigation, or the like.

The display apparatus 100 may obtain a plurality of contents frames based on a predetermined content type, and display a plurality of content frames and a plurality of identification frames by disposing at least one content frame among the plurality of content frames between the plurality of identification frames including a predetermined image.

For example, the display apparatus 100 may obtain a plurality of content frames included in the advertisement content if the content to be displayed is an advertisement content, and divide the plurality of content frames into nine frame groups. For example, if the plurality of content frames includes a total of 90 individual content frames, the display apparatus 100 may group the plurality of content frames sequentially from 1 to 10, 11 to 10, . . . , 81 to 90 into frame groups, and insert identification frames including a predetermined image immediately preceding a frame 1, between each frame group among the frame groups, and immediately succeeding frame 90. In this case, the number of identification frames to be inserted may be ten. Accordingly, the display apparatus 100 may sequentially display a plurality of content frames and identification frames.

Here, the predetermined image may be an image to identify an area corresponding to the display of the display apparatus 100 from a photographed image including the display of the display apparatus 100. For example, a photographing device may perform photographing to include the display apparatus 100. In other words, the plurality of photographed frames included in the photographed content by the photographing device may include the display apparatus 100. In the photographed content, an operation to identify the display of the display apparatus 100 will be described below.

In the above-mentioned example, the display apparatus 100 divides the plurality of content frames into a plurality of groups, but this is for convenience of description. For example, the display apparatus 100 may sequentially display the plurality of content frames, and may add an identification frame immediately preceding or succeeding the predetermined content frame among the plurality of content frames. Alternatively, the display apparatus 100 may display at least one content frame among a plurality of content frames immediately succeeding displaying a first identification frame among the plurality of identification frames, display a second identification frame immediately succeeding the first identification frame, and again display at least one content frame among the plurality of content frames.

The server 200 may be an apparatus that stores a plurality of contents and transmits the plurality of contents, and may be a broadcasting station server, or the like.

In particular, the server 200 may store photographed content in which the display apparatus 100 is photographed. For example, a photographing device may capture a photograph in which the display apparatus 100 is included, and the server 200 may receive from the photographing device the photograph that is obtained by the photographing device. The photograph in which the display apparatus 100 is included may be stored in memory of the server 200. However, the embodiment is not limited thereto, and the server 200 may include a camera, and may capture a photograph in which the display apparatus 100 is included through the camera. In this case, the server 200 may also store the photographed content that is directly photographed.

The server 200 may identify a predetermined image from a plurality of photographed frames included in the photographed contents, and, based on the predetermined image, may obtain first information indicating an area that corresponds to the display of the display apparatus 100 and second information indicating a point of time when the predetermined type content is displayed in the display apparatus 100.

The server 200 may transmit the photographed content, the first information, and the second information to the electronic apparatus 300. The server 200 may transmit, to the electronic apparatus 300, first information and second information as metadata of the photographed content. Alternatively, the server may separately transmit, to the electronic apparatus 300, the first information and the second information apart from the photographed content.

The server 200 may change an area corresponding to the display of the display apparatus 100 in at least one photographed frame among a plurality of photographed frames to include other content, which is different from content displayed on the display of the display apparatus 100 when the display apparatus 100 is photographed, based on the first information and the second information. In this case, the server 200 may transmit, to the electronic apparatus 300, photographed content, in which a partial area is changed to other content, and may not transmit the first information and the second information to the electronic apparatus 300. However, the embodiment is not limited thereto, and the server 200 may transmit the first information and the second information to the electronic apparatus 300, even if the photographed content, in which a partial area is changed to other content, is transmitted to the electronic apparatus 300.

The electronic apparatus 300 may be an apparatus that receives content, such as a set-top box, performs image processing on the received content, and provides the processed image content to a display apparatus connected to the electronic apparatus 300. However, the embodiment is not limited thereto, and the electronic apparatus 300 may be itself configured to receive content, execute image processing on the received content, and directly display the image-processed content, such as a TV, a desktop PC, and a notebook computer having a display.

The electronic apparatus 300 may receive, from the server 200, a photographed content, first information indicating an area corresponding to the display of the display apparatus 100, and second information indicating a point of time when a predetermined type content is displayed in the display apparatus.

The display apparatus 100 may change an area corresponding to the display of the display apparatus 100 in at least one photographed frame among the plurality of photographed frames included in a photographed content to other content based on the first information and the second information.

Through the above operation, the server 200 may more accurately identify a predetermined area in a photographed content, and the server 200 or the electronic apparatus 300 may change an identified area to display other content.

FIG. 2A is a block diagram illustrating a configuration of a display apparatus according to an embodiment.

Referring to FIG. 2A, the display apparatus 100 includes a display 110 and a processor 120.

The display 110 is configured for displaying an image processed by the processor 120. The display 110 may be implemented as a cathode ray tube (CRT), a liquid crystal display (LCD), a light emitting diode (LED), a plasma display panel (PDP), or the like, but the display 100 is not limited thereto. In addition, the display 110 may be implemented as a flexible display, a transparent display, or the like.

The processor 120 is configured to control overall operations of the display apparatus 100.

The processor 120 may be implemented as a digital signal processor (DSP), a microprocessor, and a time controller (TCON) for processing a digital image signal, but the processor 120 is not limited thereto. The processor 120 may be implemented to include one or more among a central processing unit (CPU), a micro controller unit (MCU), a micro processing unit (MPU), a controller, an application processor (AP), a communication processor (CP), and an Advanced Reduced instruction set computing (RISC) Machine (ARM) processor or may be defined as a corresponding term. The processor 120 may be implemented in a system on chip (SoC) type or a large scale integration (LSI) type in which a processing algorithm is contained, or in a field programmable gate array (FPGA) type. The processor 120 may perform various functions by executing computer executable instructions read from a memory.

The processor 120 may obtain a plurality of content frames based on a predetermined type of content, and control the display 110 to display a plurality of content frames and a plurality of identification frames by placing at least one of the plurality of content frames between a plurality of identification frames including a predetermined image.

The predetermined image may be an image to identify an area corresponding to the display 110 in a photographed image including the display 110. That is, the predetermined image may be an image to identify a pixel area excluding a bezel of the display 110 from a photographed image including the display 110.

According to an embodiment, a predetermined type content may be an advertisement content. That is, the processor 120, if the content to be displayed is an advertisement content, may control the display 110 to display the advertisement content and a plurality of identification frames.

The processor 120 may identify the advertisement content based on the metadata of the content. Alternatively, the processor 120 may identify the advertisement content through identification of an object from a displayed content frame.

The processor 120 may change a scanning speed of the display 110 based on the frame rate of the content and the number of the plurality of identification frames.

For example, when the frame rate of the content is 60 frames per second (FPS), and the scanning speed of the display 110 is 60 Hz, if the processor 120 adds ten identification frames, the scanning speed of the display 110 may be changed to 70 Hz. This operation allows the processor 120 to reproduce the content without changing the reproduction time of the content.

The processor 120 may determine the number of plurality of identification frames including a predetermined image based on the frame rate of the content. The processor 120 may further consider a maximum scanning speed of the display 110.

For example, if the frame rate of the content is 50 frames per second (FPS), and the maximum scanning speed of the display 110 is 60 Hz, the processor 120 may determine the number of identification frames to be ten or less. If the number of identification frames exceeds ten, the frame rate may be greater than the maximum scanning speed of the display 110, and the reproduction time of the content may be changed.

The processor 120 may insert each of a plurality of content frames between the plurality of content frames at a predetermined interval. However, the embodiment is not limited thereto, and the processor 120 may insert each of the plurality of identification frames between a plurality of content frames in any configuration. For example, the processor 120 may insert an identification frame whenever a scene is changed in a plurality of content frames, and thus the identification frame may be immediately succeeding a final frame in a first scene and immediately preceding a first frame in a second scene.

The processor 120 may place a first content frame among the plurality of content frames immediately succeeding an initial identification frame of the plurality of identification frames, and place a last frame among the plurality of content frames immediately preceding to the last identification frame of the plurality of identification frames. Through this operation, a reproduction start time and position within a plurality of frames, and a reproduction end time and position within the plurality of frames, of a predetermined type of content may be identified.

The processor 120 may control the display 110 to display a plurality of content frames and a plurality of identification frames by disposing at least one content frame among a plurality of content frames between the first identification frame including a first identification image and the second identification frame including a second identification image.

For example, the processor 120 may control the display 110 to display a plurality of content frames and a plurality of identification frames by placing at least one of the plurality of content frames between a first identification frame of which an entire area is red and a second identification frame of which an entire area is blue. This configuration provides emphasis to the difference between the identification frame and the content frame before and after the identification frame, and hence distinguishing the identification frames and the content frames may be more accurately performed.

The processor 120 may change some content frames among a plurality of content frames to an identification frame including a predetermined image.

For example, the processor 120 may change the 30th and 60th content frames among the 60 content frames into an identification frame including a predetermined image. Because the content is reproduced at a high frame rate, which may be beyond a recognition rate of a human viewer, even if some frames are changed to identification frames, a viewer may not recognize the inclusion of the identification frames. However, the server 200 may be configured to recognize the identification frames even when reproduced at a high frame rate.

Here, the processor 120 may change a pixel value of a predetermined area from each of a part of content frames and change the part of content frames into identification frames including a predetermined image.

For example, the processor 120 may change a pixel value of an edge area of each of a part of content frames into white, and change the part of content frames into identification frames including a predetermined image.

As described above, the processor 120 adds the identification frames, and the processor 120 adds the identification frames and changes a part of content frames into identification frames, but the embodiment is not limited thereto. For example, the processor 120 may change only a part of content frames into identification frames without adding the identification frames. In this case, the processor 120 may not change the scanning speed of the display 110.

Figure 2B:
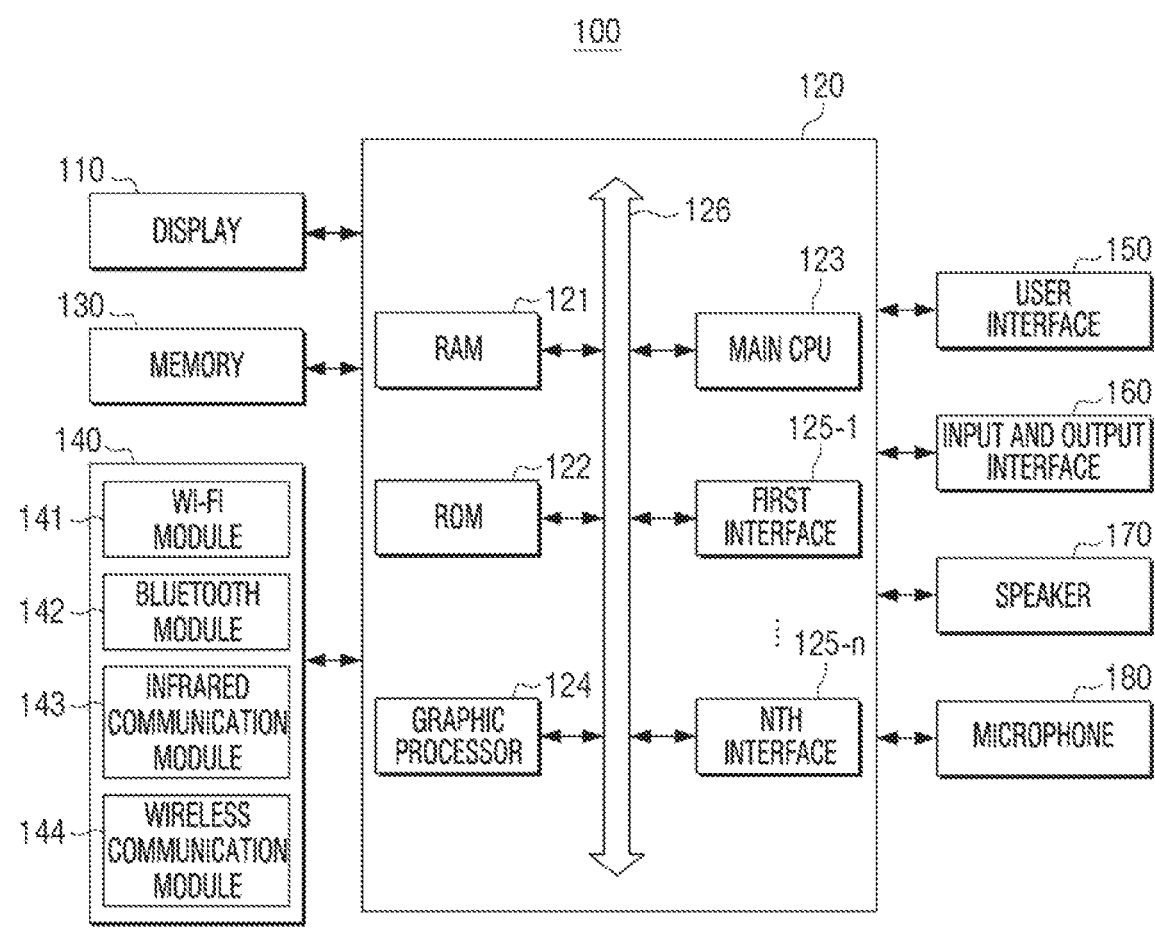
FIG. 2B is a block diagram illustrating a specific configuration of a display apparatus according to an embodiment.

FIG. 2B is a block diagram illustrating a specific configuration of the display apparatus 100 according to an embodiment. The display apparatus 100 may include the display 110 and the processor 120. According to FIG. 2B, the display apparatus 100 may further include a memory 130, a communication interface 140, a user interface 150, an input and output interface 160, a speaker 170, and a microphone 180. A detailed description of the configurations redundant with those described above with respect to FIG. 2A among those shown in FIG. 2B will be omitted.

The display 110 may be implemented as various types of a display such as a liquid crystal display (LCD), an organic light emitting diode (OLED) display, a plasma display panel (PDP), or the like. In the display 110, a driving circuit and a backlight unit, which may be implemented in the form of an a-si TFT, a low temperature poly silicon (LTPS) TFT, an organic TFT (OTFT) may be included as well. The display 110 may be implemented as a touch screen coupled with a touch sensor, a flexible display, a third-dimensional display (3D display), or the like.

The display 110 according to an embodiment may include a display panel for outputting an image and a bezel for housing a display panel. In particular, a bezel according to an embodiment may include a touch sensor for detecting a user interaction.

The memory 130 is electrically connected to the processor 120 and may store data and programs necessary for implementing various embodiments of the disclosure. In this case, the memory 130 may be implemented as an internal memory, such as read only memory (for example, electrically erasable programmable read-only memory (EEPROM)), random-access memory (RAM), or the like, included in the processor 120, or a memory separate from the processor 120. In this case, the memory 130 may be implemented as a memory embedded with the electronic apparatus 100, or may be implemented as a detachable memory in the electronic apparatus 100, according to the data usage purpose. For example, data for driving the electronic apparatus 100 may be stored in a memory embedded in the electronic apparatus 100, and data for an expanded or upgraded function of the electronic apparatus 100 may be stored in the memory detachable from the electronic apparatus 100. A memory embedded in the electronic apparatus 100 may be a volatile memory, such as a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD). In the case of a memory detachably mounted to the electronic apparatus 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a USB memory) connectable to the USB port, or the like.

The memory 130 may store various data such as an operating system (O/S) module for driving the display apparatus 100, an image processing module, and an image module, or the like.

The processor 120 controls overall operations of the electronic apparatus 100 by reading and executing various programs stored in the memory 130.

To be specific, the processor 120 includes the RAM 121, the ROM 122, a main CPU 123, a first to $n^{th}$ interfaces 125-1 ~125-$n$, and a bus 126. The processor may also include a graphics processor 124, but the graphics processor 124 may be separately provided in the display apparatus. For example, the graphics processor 124 may include a graphics processing unit (GPU) that coordinates with the processor 120 to control operations of displaying content on the display 110.

The RAM 121, ROM 122, main CPU 123, the first to $n^{th}$ interfaces 125-1 to 125-n, or the like, may be interconnected through the bus 126.

The ROM 122 stores one or more instructions for booting the system and the like. When an instruction to boot the display apparatus 100 is input and power is supplied, the CPU 123 copies the OS stored in the memory 130 to the RAM 121 according to the stored one or more instructions in the ROM 122, and executes the OS to boot the system. When the booting is completed, the CPU 123 copies various application programs stored in the memory 130 to the RAM 121, executes the application program copied to the RAM 121, and performs various operations.

The main CPU 123 accesses the memory 130 and performs booting using an operating system (OS) stored in the memory 130, and performs various operations using various programs, contents data, or the like, stored in the memory 130.

The first to $n^{th}$ interface 125-1 to 125-n are connected to the various elements described above. One of the interfaces may be a network interface connected to an external device through the network.

The graphics processor 124 may perform a graphic processing function (video processing function). For example, the graphics processor 124 may generate a screen including various objects such as icons, images, text, and the like. In graphics processor 124, a calculator may calculate an attribute value such as a coordinate value, a shape, a size, and a color to be displayed by each object according to the layout of the screen based on the received control command. A renderer may generate display screens of various layouts including objects based on the attribute value calculated by the calculator. The processor 120 and/or the graphics processor 124 may perform various image processing such as decoding, scaling, noise filtering, frame rate conversion, resolution conversion, or the like, for the video data.

The processor 120 may perform processing of audio data. Specifically, the processor 120 may perform various audio processing such as decoding, amplifying, noise filtering, and the like, on the audio data.

The communication interface 140 may communicate with other external devices of various types such that data may be transmitted between the display apparatus 100 and other external devices. The communication interface 140 includes a Wi-Fi module 141, a Bluetooth module 142, an infrared communication module 143, a wireless communication module 144, or the like. Each communication module may be implemented as at least one hardware chip and other hardware necessary to implement communication. For example, if communication is wirelessly performed, the communication module may include an antenna or infrared transceiver for transmission and reception of data. If communication is performed by wire, then the communication interface may include a port, such as an Ethernet or fiber optical port, or the like.

The processor 120 may communicate with various external devices using the communication interface 140. Here, the external device may include a display device such as a TV, an image processing device such as a set-top box, an external server, a control device such as a remote control, an audio output device such as a Bluetooth speaker, a lighting device, a smart cleaner, a home appliance such as a smart refrigerator, a server such as an Internet of things (TOT) home manager, or the like. Of course, the external device may include the server 200 or the electronic apparatus illustrated in FIG. 1.

The Wi-Fi module 141 and the Bluetooth module 142 perform wireless communication using Wi-Fi method and Bluetooth protocols, respectively. When using the Wi-Fi module 141 or the Bluetooth module 142, various connection information such as a service set identifier (SSID) and a session key may be transmitted and received to establish a communication session, and communication information may be transmitted after a communication connection is established.

The infrared ray communication module 143 performs communication according to infrared data association (IrDA) technology that transmits data wireless to local area using infrared ray between visible rays and millimeter waves.

The wireless communication module 144 may include at least one communication chip performing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the communication modes described above.

As noted above, in a wired configuration the communication interface 140 may also include at least one of a local area network (LAN) module, Ethernet module, or wired communication module performing communication using a pair cable, a coaxial cable, an optical cable, or the like.

According to an embodiment, the communication interface 140 may use the same communication module (for example, Wi-Fi module) to communicate with an external device such as a remote controller and an external server.

In accordance with another example, the communication interface 140 may utilize different communication modules (for example, Wi-Fi modules) to communicate with an external device, such as a remote controller and an external server. For example, the communication interface 140 may use at least one of an Ethernet module or a Wi-Fi module to communicate with an external server, and may use a Bluetooth (BT) module to communicate with an external device such as a remote controller. However, this is merely exemplary, and the communication interface 140 may use at least one communication module among various communication modules when communicating with a plurality of external devices or an external server.

If the display apparatus 100 is further configured to receive and process video content, the display apparatus 100 may further include a tuner and a demodulator according to an example.

The tuner may receive a radio frequency (RF) broadcasting signal by tuning a channel selected by a user or all the prestored channels, from among RF broadcasting signals that are received through an antenna.

A demodulator may receive and demodulate a digital intermediate frequency (DIF) signal that is converted by the tuner, and perform channel decoding, or the like.

The user interface 150 may be implemented as a button, a touch pad, a mouse, and a keyboard, or may be implemented as a touch screen which may perform the display function and a manipulation input function as well. Here, the button may be various types of buttons such as a mechanical button, a touch pad, a wheel, or the like formed on an arbitrary region such as a front part, a side part, a back part, or the like, of an outer part of the main body of the electronic apparatus 100.

The input and output interface 160 may be one of the high-definition multimedia interface (HDMI), mobile high-definition link (MHL), universal serial bus (USB), display port (DP), Thunderbolt, video graphics array (VGA) port, RGB port, d-subminiature (D-SUB), digital visual interface (DVI), and the like. Where appropriately supported, the input and output interface 160 may be configured to perform communication with external devices, separately or in conjunction with the communication interface 140.

The input and output interface 160 may input and output at least one of an audio signal and a video signal.

According to an example, the input and output interface 160 may include a port to input and output only an audio signal or a port to input and output only a video signal as a separate port, or may be implemented as a port which input and output both the audio signal and the video signal.

The speaker 170 may be an element to audibly output various audio data, various alarm sounds, a voice message, or the like, which are processed by the input and output interface 160.

The microphone 180 is an element to receive a user voice or other sound and convert the received sound to audio data.

The microphone 180 may receive the user voice in an active state. For example, the microphone 180 may be integrally formed as an integral unit on an upper side, a front side direction, a side direction, or the like of the electronic apparatus 100. The microphone may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like. When receiving the user voice, the sound signal thereof may be converted to commands for controlling the display apparatus 100.

Figure 3:
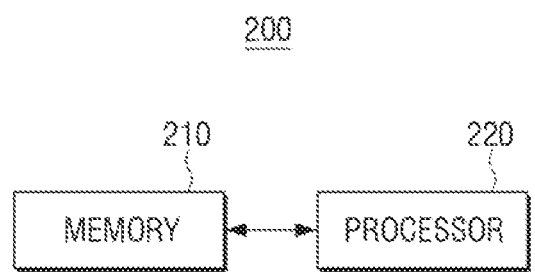
FIG. 3 is a block diagram illustrating a configuration of a server according to an embodiment.

FIG. 3 is a block diagram illustrating a configuration of the server 200 according to an embodiment.

Referring to FIG. 3, the server 200 includes a memory 210 and a processor 220.

The memory 210 may store the photographed content, which includes the display apparatus 100. For example, the photographed content may include a plurality of photographed frames, and the display apparatus 100 may be photographed in an area of the plurality of photographed frames. The photographing content may be photographed through a separate photographing apparatus or may be photographed through a camera included in the server 200.

The memory 210 may be implemented as a hard disk, a non-volatile memory, a volatile memory, or the like, and may be any configuration that may store data. The memory may be similar to the memories 121, 122, 123 described above with respect to the display apparatus 100 of FIG. 2B, and a redundant description of the memory 210 is omitted.

The processor 220 controls overall operations of the server 200.

The processor 220 may identify a predetermined image in a plurality of photographed frames included in the photographed content. For example, the processor 220 may identify an identification image of a white square image in one of a plurality of photographed frames included in the photographed content. However, the embodiment is not limited thereto and the predetermined image may be any other color, shape, or the like that may be detected within an image by the server 200. Further, the predetermined image may include a plurality of colors and may include a plurality of areas.

The processor 220 may obtain the first information indicating an area corresponding to the display 110 of the display apparatus 100 and the second information indicating a point of time when a predetermined type content is displayed in the display apparatus 100.

For example, the processor 220 may identify an area in which a predetermined image is identified in each of the plurality of imaging frames included in the photographed content as an area corresponding to the display 110 of the display apparatus 100. Further, the processor 220 may identify a photographed frame in which a predetermined image is identified in a plurality of photographed frames included in the photographed content as a point of time in which the predetermined type of content is displayed.

The predetermined image may be included in a plurality of identification frames, and at least one content frame among the plurality of content frames included in a predetermined type content may be displayed in a state to be disposed between the plurality of identification frame. As noted above, the identification frame may be a frame of content in which a particular portion of the frame of content includes an identification image that signals presence of the predetermined type content.

Specifically, the processor 220 may identify a plurality of predetermined images from a plurality of photographed frames, and obtain second information based on a first identified predetermined image and a last identified predetermined image among a plurality of predetermined images.

The processor 220 may identify a plurality of predetermined images in a plurality of photographed frames, and may obtain first information based on a first identified predetermined image and a last identified predetermined image among a plurality of predetermined images.

In other words, the processor 220 may compare the predetermined image identified in each of the plurality of photographed frames in order to improve the identification accuracy of the predetermined image. The processor 220 may obtain the first information and the second information by using only the initially identified predetermined image and the last identified predetermined image.

The processor 220 may change an area corresponding to the display 110 in an at least one photographed frame among a plurality of photographed frames to another content based on the first information and the second information.

For example, when the first information is that the x coordinate is 1000 to 1200, the y coordinate is 500 to 600 in the photographed frame of 1920×1080, and the second information is that from the $20^{th}$ to $40^{th}$ frame among the 100 frames, the processor 220 may change an area in which the x coordinate is 1000 to 1200 and they coordinate is 500 to 600 in the 20th to 40th frame among the 100 frames to other content.

Here, the other content may be a content stored in the memory 210 of the server 200. Alternatively, the another content may be a content received from an external server.

The server 200 may further include a communication interface, and the processor 220 may control the communication interface to transmit the photographed content, the first information, and the second information to the electronic apparatus 300.

In FIG. 3, the hardware configuration of the processor 220 and the communication interface may be the same as the processor 120 and the communication interface 140 of the display apparatus 100, and a redundant description thereof is omitted.

Figure 4:
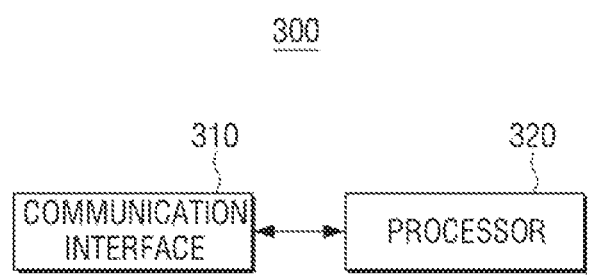
FIG. 4 is a block diagram illustrating a configuration of an electronic apparatus according to an embodiment.

FIG. 4 is a block diagram illustrating a configuration of the electronic apparatus 300 according to an embodiment.

Referring to FIG. 4, the electronic apparatus 300 includes a communication interface 310 and a processor 320. Because the hardware configuration of the processor 320 and the communication interface 310 of FIG. 4 is similar to the communication interface 140 and the processor 120 of FIG. 2B, a redundant description thereof will be omitted.

The processor 320 may receive, from the server 200, a photographed content, first information indicating an area corresponding to the display 110 of the display apparatus 100 included in the photographed content, and the second information indicating a point of time when a predetermined type content is displayed in the display apparatus 100 through the communication interface 310.

For example, the processor 320 may receive the photographed content of 100 frames, first information indicating that x axis is 1000-1200 and y axis is 500-600 in the photographed frame of 1920×1080 in which the area corresponding to the display 110 of the display apparatus 100 is 1920×1080 and second information indicating that the point of time when a predetermined type content is displayed is from $20^{th}$ to $40^{th}$ frame among 100 frames, through the communication interface 310.

The processor 320 may change an area corresponding to the display 110 from at least one photographed frame among a plurality of photographed frames included in the photographed content to other content based on first information and second information.

In the above example, the processor 320 may change an area in which x coordinate is 1000-1200 and y coordinate is 500-600 in the $20^{th}$ frame to $40^{th}$ frame among 100 frames to other content.

The electronic apparatus 300 may further include a display and the processor 320 may control the display to display other content.

In FIGS. 3 and 4, it has been described that the first information is a rectangular area, but the first information is not limited thereto. For example, the first information may be in any area of the display, such as a triangle area or the like, and may include tilt information. The first information may be information that is stored as a vector.

Through the operation of the electronic system 1000, identification accuracy of an area corresponding to the display 110 from the photographed content may be improved, identification may be easier, and replacement content may be provided through the identified area.

Hereinbelow, an operation of the electronic system will be described in greater detail.

Figure 5A:
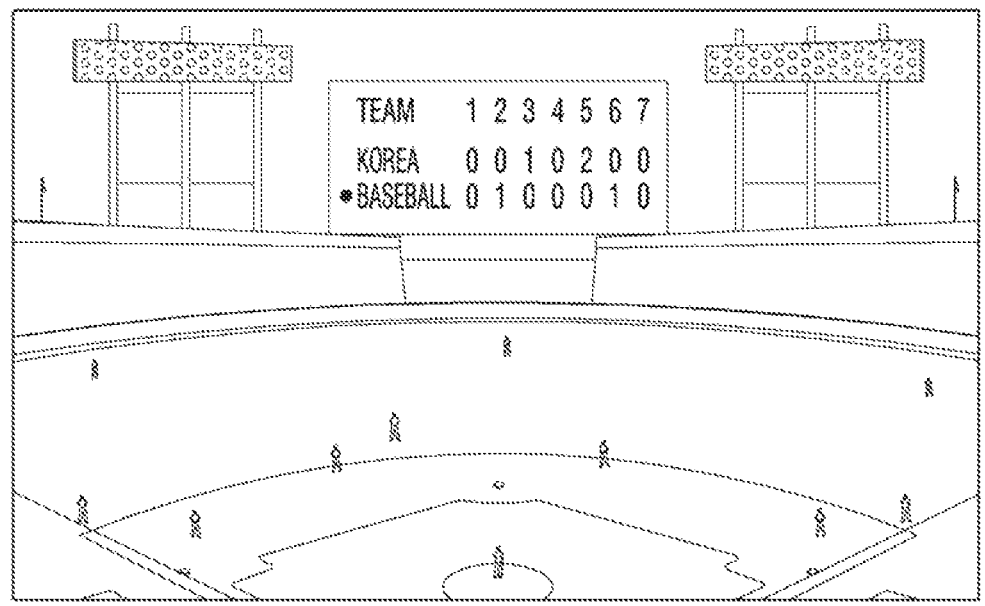
FIGS. 5A and 5B are views illustrating context of embodiments of the disclosure.
Figure 5B:
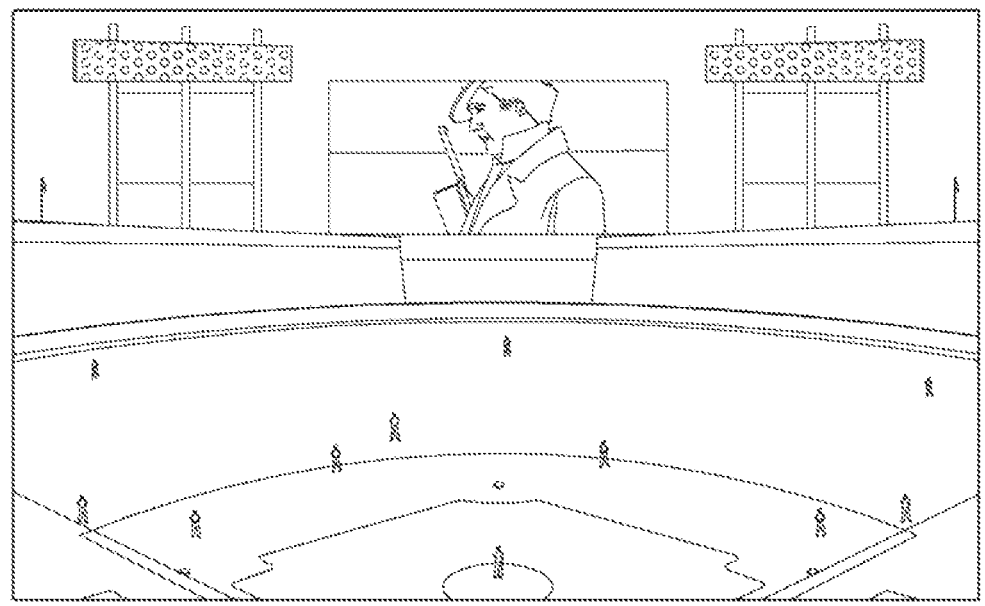

FIGS. 5A and 5B are views illustrating context of embodiments of the disclosure.

The display apparatus 100 may be an electronic scoreboard of a baseball stadium as illustrated in FIG. 5A. The electronic scoreboard is a device that provides visitors of a baseball stadium with information, such as for a screen including information of a baseball team.

In this case, the electronic scoreboard may display a plurality of identification frames on the information screen for the baseball team. Alternatively, the electronic scoreboard may display advertisement contents while displaying an information screen of a baseball team, and may display a plurality of identification frames added to the advertisement contents. Here, the advertisement content may be a beer advertisement for visitors of the baseball stadium, or the like.

The photographing device may photograph the electronic scoreboard as illustrated in FIG. 5A. The photographed content photographed by the photographing device may be streamed on a real-time basis.

The photographed content photographed by the photographing device may be transmitted to the server 200. The server 200 may identify the identification frame from the image of the photographed content illustrated in FIG. 5A and identify position of the electronic scoreboard area in the photographed content.

The server 200 may add other content to the electronic scoreboard area, based on the position of the electronic scoreboard area in the photographed content, and transmit the content to the electronic apparatus 300. The electronic apparatus 300 may be a set top box in a home. As illustrated in FIG. 5B, the electronic apparatus 300 may display photographed content to which other content is added. Accordingly, instead of content displaying beer advertising targeted to viewers in the stadium, the viewer in the home may watch other content instead of the information screen or advertisement content of the baseball team. The other content may be, for example, an advertisement of home appliances for viewers in the home, or the like. Thereby, advertising targeted to the audience in the stadium, such as beer, may be replaced with advertising, such as for home appliances, targeted to the audience in another location, such as in a home.

Alternatively, the server 200 may identify the electronic scoreboard area, and transmit the photographed content and the identified information to the electronic apparatus 300. The electronic apparatus 300 may be a set-top box in a home and the electronic apparatus 300 may add the other content to the photographed content based on the identified information and display the content. The other content may be a household appliance advertisement for a viewer in the home or the like.

In this case, the electronic apparatus 300 may determine the replacement content according to the viewer's viewing pattern. For example, the electronic apparatus 300 disposed in a first home may store information that a first viewer is much interested in a home shopping channel in ordinary days, and may add and display the home appliance advertisement to the photographed content. The electronic apparatus 300 disposed in the second home may store information that the second viewer is much interested in a movie in ordinary days, and may add and display a movie trailer on the photographed content. Accordingly, the replacement content may be associated with a user profile, and the user profile may be referenced to select the replacement content to be provided to the user in the external location.

Alternatively, the server 200 or the electronic apparatus 300 may determine the other content based on the current time information. For example, the server 200 or the electronic apparatus 300 may determine the content for a traffic condition as the other content before 9:00 am, and determine a movie trailer as the other content after 8:00 pm.

FIGS. 6A, 6B, 6C, and 6D are views illustrating a method of adding an identification frame according to an embodiment.

Figure 6A:
FIGS. 6A, 6B, 6C, and 6D are views illustrating a method of adding an identification frame according to an embodiment.

FIG. 6A illustrates an example of a predetermined type content. The frame as FIG. 6A may be maintained for three seconds for convenience of description. The embodiment is not limited thereto, and the predetermined type content may be an image in which each content frame is different from each other.

Figure 6B:
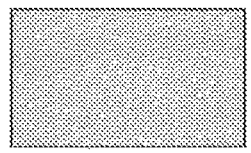

FIG. 6B is an embodiment of an identification frame including a predetermined identification image. Here, the predetermined identification image may be an image of a solid color. Alternatively, the predetermined image may be a noise image with a predetermined pattern, such as a bar code, QR code, or other code for conveying information.

The predetermined pattern may indicate the first information and/or the second information, as described above.

Figure 6C:

As illustrated in FIG. 6C, the processor 120 of the display apparatus 100 may control the display 110 to display a plurality of content frames and a plurality of identification frames by placing at least one of the plurality of content frames between a plurality of identification frames including a predetermined image.

In particular, the processor 120 may place a first content frame among the plurality of content frames immediately succeeding a first identification frame among the plurality of identification frames, and place a last content frame among the plurality of content frames immediately preceding to the last identification frame among the plurality of identification frames. Accordingly, the server 200 may identify a start point and an end point of the predetermined type of content.

In FIG. 6C, it has been described three content frames and two identification frames only for convenience of description, but a content frame and an identification frame may be placed in any other order.

Figure 6D:

Although FIG. 6C has been described as adding an identification frame, the embodiment is not limited thereto. For example, as illustrated in FIG. 6D, the processor 120 may change a pixel value of the corner area in each of the initial content frame and the last content frame among the plurality of content frames. Alternatively, if the frame rate of the predetermined type of content is sufficiently high, the processor 120 may replace each of the initial content frame and the last content frame among the plurality of content frames with an identification frame.

FIG. 6D illustrates changing a pixel value of a corner area, but the embodiment is not limited thereto. For example, the processor 120 may change the pixel value of the predetermined number from the edge area of the content frame.

Figure 7:
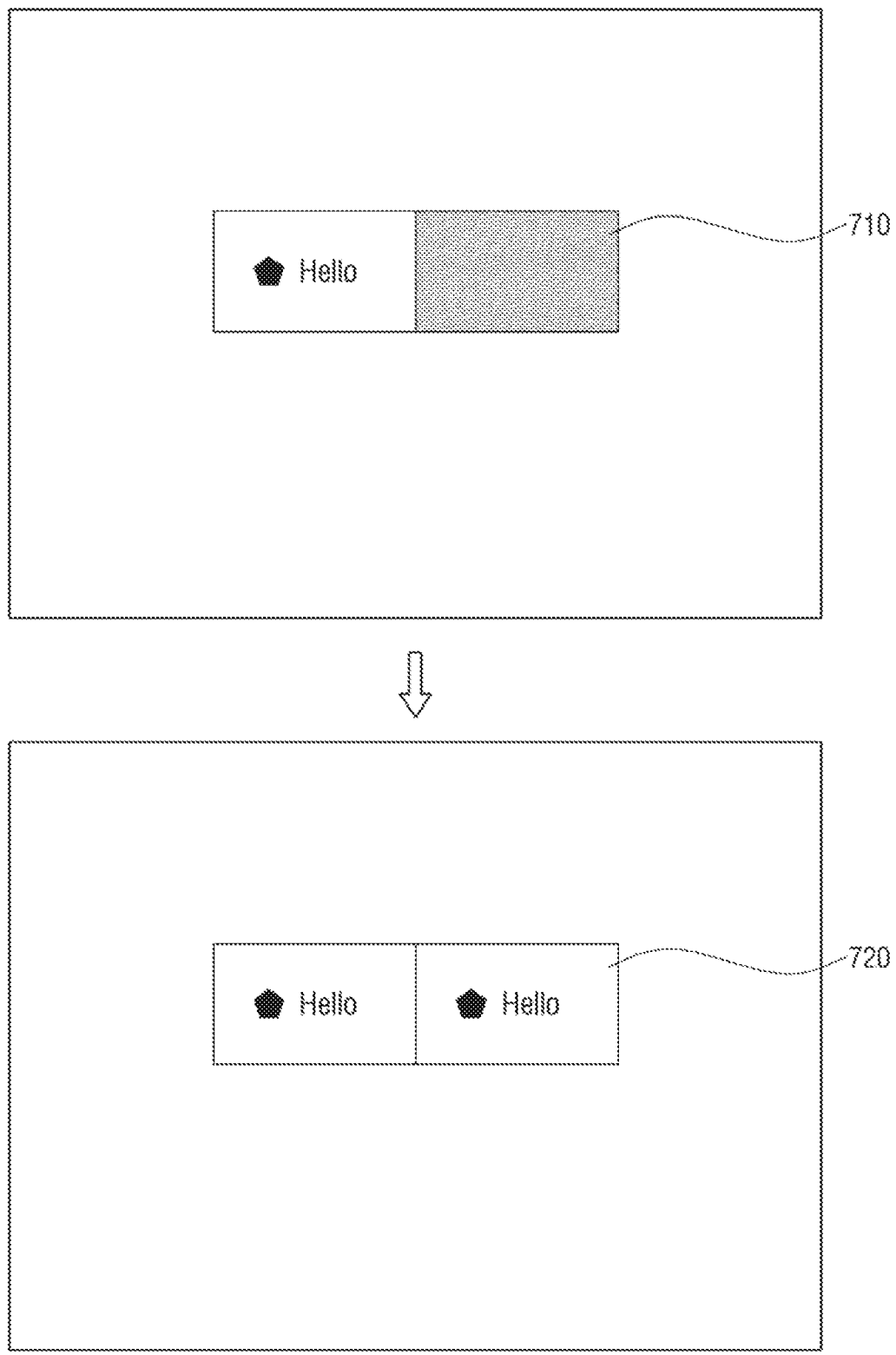
FIG. 7 is a view illustrating a method for identifying an identification frame according to an embodiment.

FIG. 7 is a view to describe a method for identifying an identification frame according to an embodiment. In FIG. 7, it is assumed a photographed content in which a first display apparatus in the left side and a second display apparatus in the right are photographed.

An upper drawing of FIG. 7 indicates a first photographed frame of the photographed content and a lower drawing of FIG. 7 indicates a second photographed frame following the first photographed frame.

The processor 220 of the server 200 may identify a predetermined image 710 from the first photographed frame and identify the first information indicating an area corresponding to the display of the display apparatus based on the predetermined image.

The processor 220 may identify the predetermined image 710 from the first photographed frame and identify how much the identified area is changed in the second photographed frame. When a difference of a pixel value between the predetermined image 710 in the first photographed frame and an area 720 in the second photographed frame corresponding to the identified area is greater than or equal to a predetermined value, the processor 220 may obtain the identified area as the first information. In other words, the area or position of the frame may be determined from the area or position of the predetermined image 710. Accordingly, the predetermined image 710 itself is representative of the area in which to display the alternative content. Alternatively, if the predetermined image 710 includes a pattern, such as a bar code, QR code, the processor 220 may identify the pattern and determine first information and/or second information corresponding to the pattern.

Meanwhile, in FIG. 7, only two photographed frames are illustrated for convenience of description, but the embodiment is not limited thereto. For example, if there are 100 photographed frames, a predetermined image may be included in the first photographed frame, $50^{th}$ photographed frame, and $100^{th}$ photographed frame. In this case, the processor 220 may obtain, as the first information, an area in which the predetermined image is identified in the first photographed frame, the $50^{th}$ photographed frame, and the $100^{th}$ photographed frame. The processor 220, if a predetermined image is not identified from the remaining photographed frames, may obtain the first information using only the first photographed frame, the $50^{th}$ photographed frame, and the $100^{th}$ photographed frame in which the predetermined image is identified.

The processor 220 may identify a plurality of predetermined images from the plurality of photographed frames, and may obtain second information based on the initially identified predetermined image and the last identified predetermined image among the plurality of predetermined images. In the above-described example, the processor 220 may obtain second information including a reproduction time of the first photographed frame and a reproduction time of the $100^{th}$ photographed frame.

FIG. 7 describes that only the predetermined image of the second display apparatus on the right side is identified, but the processor 220 may identify the predetermined image of the first display apparatus on the left side. That is, the processor 220 may simultaneously acquire the first information and the second information on the display area of the second display apparatus together with the first information and the second information on the display area of the first display apparatus.

Figure 8:
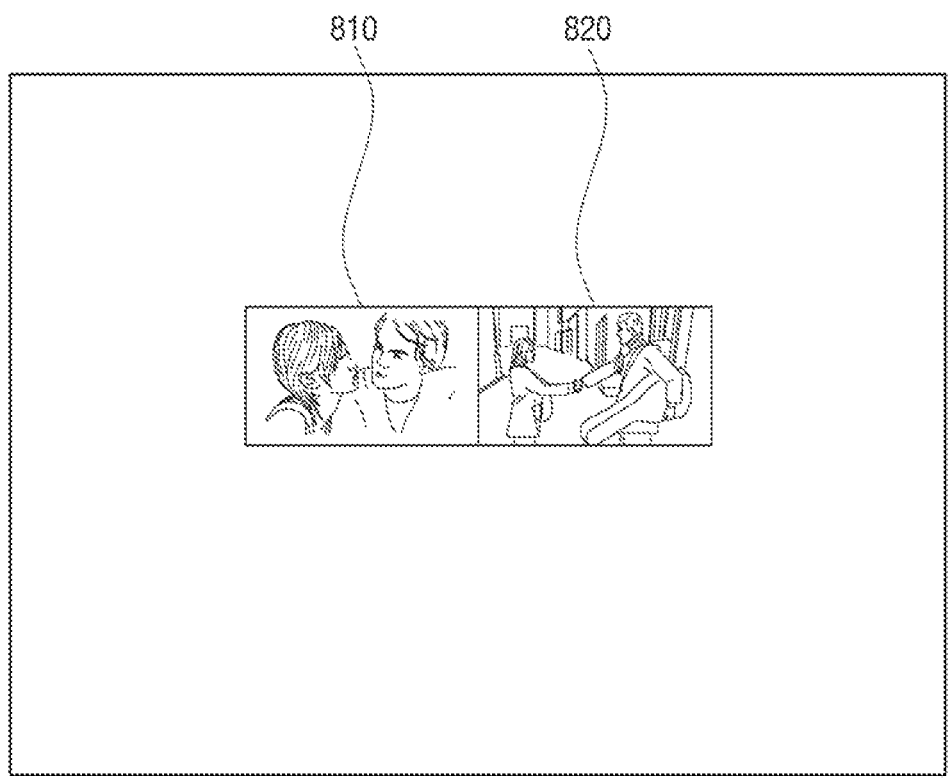
FIG. 8 is a view illustrating a method for adding other content according to an embodiment.

FIG. 8 is a view illustrating a method for adding other content according to an embodiment.

The processor 220 may change an area corresponding to the display 110 in the at least one photographed frame among the plurality of photographed frames to other content based on first information and second information.

As illustrated in FIG. 8, the processor 220 may change an area corresponding to the display of the first display apparatus based on the first information and the second information on a first area 810, and change an area corresponding to the display of the second display apparatus to a second other content based on the first information and the second information on a second area 820. That is, the processor 220 may change a plurality of areas of the photographed frame to a plurality of other content, respectively.

The embodiment is not limited thereto, and the processor 220 may transmit, to the electronic apparatus 300, information on the identified area and the photographed content, and the electronic apparatus 300 may change each of the plurality of the photographed frames to a plurality of other contents.

Figure 9:
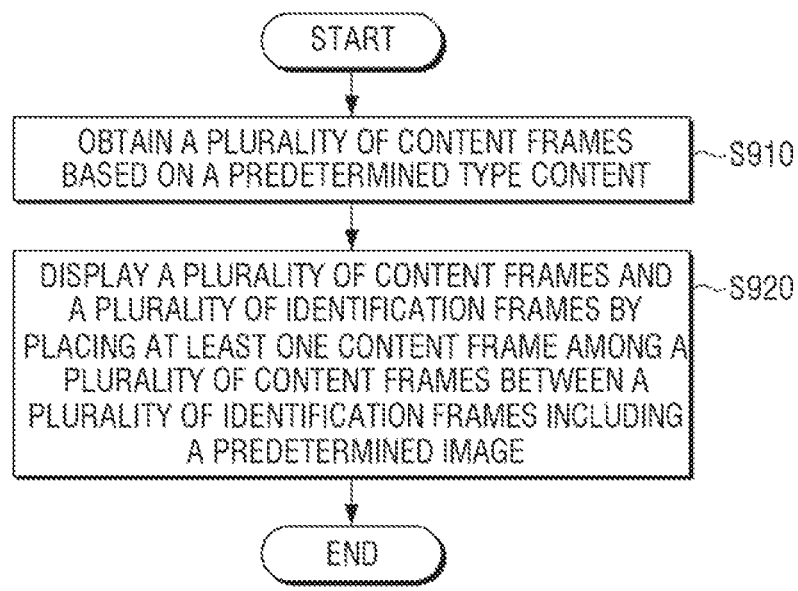
FIG. 9 is a flowchart of a method for controlling a display apparatus according to an embodiment.

FIG. 9 is a flowchart of a method for controlling a display apparatus according to an embodiment.

A plurality of content frames are obtained based on a predetermined type of content in operation S910. In operation S920, at least one content frame of the plurality of content frames may be disposed between a plurality of identification frames including a predetermined image, and a plurality of content frames and a plurality of identification frames may be displayed. Here, the predetermined image may be an image for identifying an area corresponding to the display in the photographed image including the display.

Here, the step of changing the scanning speed of the display based on the frame rate of the content and the number of a plurality of identification frames may be further included.

The step of displaying in operation S920 may include inserting each of the plurality of identification frames between the plurality of content frames in a predetermined interval.

The step of displaying in operation S920 may include disposing an initial content frame among the plurality of content frames immediately succeeding the initial identification frame, and dispose the last content frame among the plurality of contents frames immediately preceding the last identification frame among the plurality of identification frames.

The displaying in operation S920 may include displaying the plurality of contents frames and the plurality of identification frames by disposing at least one content frame among the plurality of content frames between the first identification frame including the first image and the second identification frame including the second image.

The step of changing some content frames among the plurality of content frames into an identification frame including a predetermined image may be further included.

Here, the step of changing may change a pixel value of a predetermined area from each of the part of content frames and change the part of content frames into an identification frame including a predetermined image.

In the meantime, the step of determining the number of a plurality of identification frames including a predetermined image based on the frame rate of the contents may be further included.

The predetermined type content may be an advertisement content.

Figure 10:
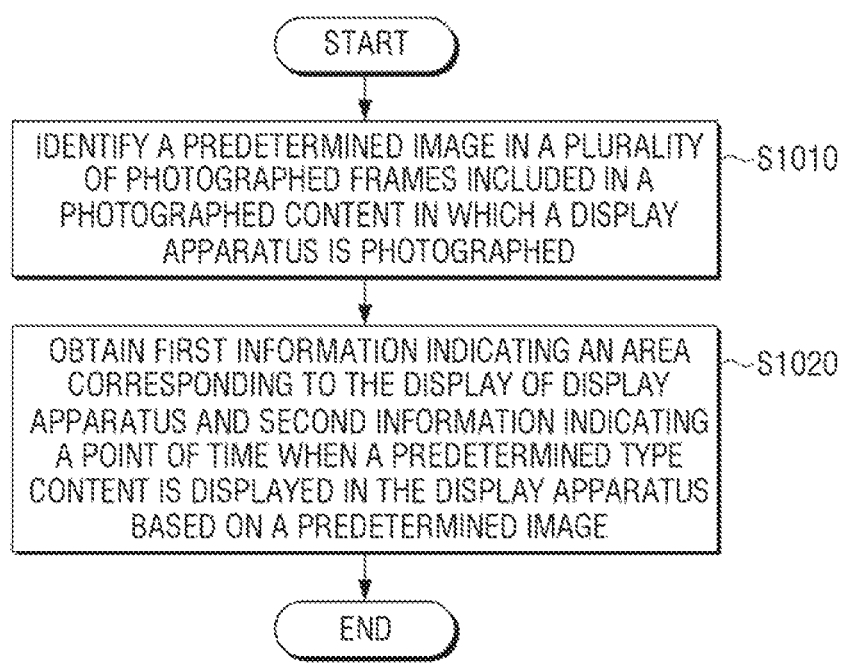
FIG. 10 is a flowchart of a method for controlling a server according to an embodiment.

FIG. 10 is a flowchart of a method for controlling a server according to an embodiment.

First, a predetermined image is identified in a plurality of photographed frames included in the photographed content in which the display apparatus is photographed in operation S1010. The first information indicating an area corresponding to the display of the display apparatus and the second information indicating a point of time when a predetermined type of content is to be displayed on the display apparatus may be obtained based on a predetermined image in operation S1020.

The first information may correspond to the area of the predetermined image. That is to say, an area in which the predetermined image is present may correspond to an area in which the replacement content is to be displayed.

Alternatively, the first information may correspond to a pattern encoded in the predetermined image. The pattern may be a QR code or a bar code that indicates the area in which the replacement content is to be displayed.

The second information may correspond to the predetermined image. The predetermined image may have a shape, a position, a color, or other characteristic thereof. The shape, position, color, or other characteristic may correspond to the point of time when a predetermined type of content is to be displayed. For example, a red color may indicate that replacement content is to be displayed in 10 frames, based on a frame reproduction rate of 60 FPS. Alternatively, a blue color may indicate that replacement content is to be displayed in 20 frames, based on a frame reproduction rate of 100 FPS.

Alternatively, the second information may correspond to a pattern encoded in the predetermined image. The pattern may be a QR code or a bar code that indicates the point of time when a predetermined type of content is to be displayed. Of course, a QR code or a bar code may indicate any of various reproduction information to control when replacement content is to be displayed, including a number of frames succeeding the predetermined image at which the replacement content is to begin to be displayed, a number of frames succeeding the predetermined image at which the replacement content is to terminate from being displayed, a quantity of the number of frames of replacement content to be displayed, a frame rate of the display apparatus that is photographed such that the length of replacement content on the display apparatus may be synchronously coordinated with the display of the original content on the other apparatus (such as an electronic scoreboard), etc.

Here, the step of changing an area corresponding to the display in at least one photographed frame among the plurality of photographed frames to other content based on the first information and the second information may be further included.

The step of identifying in operation S1010 may include identifying a predetermined image in the plurality of photographed frames, and in operation S1020 the server may obtain the second information based on the initially identified predetermined image among the plurality of predetermined images and the last identified predetermined image.

The step of transmitting the first information and the second information to the electronic apparatus may be further included.

The predetermined image may be included in the plurality of identification frames, and at least one content frame of the plurality of content frames included in the predetermined type of content may be displayed in a state disposed between the plurality of identification frames.

Figure 11:
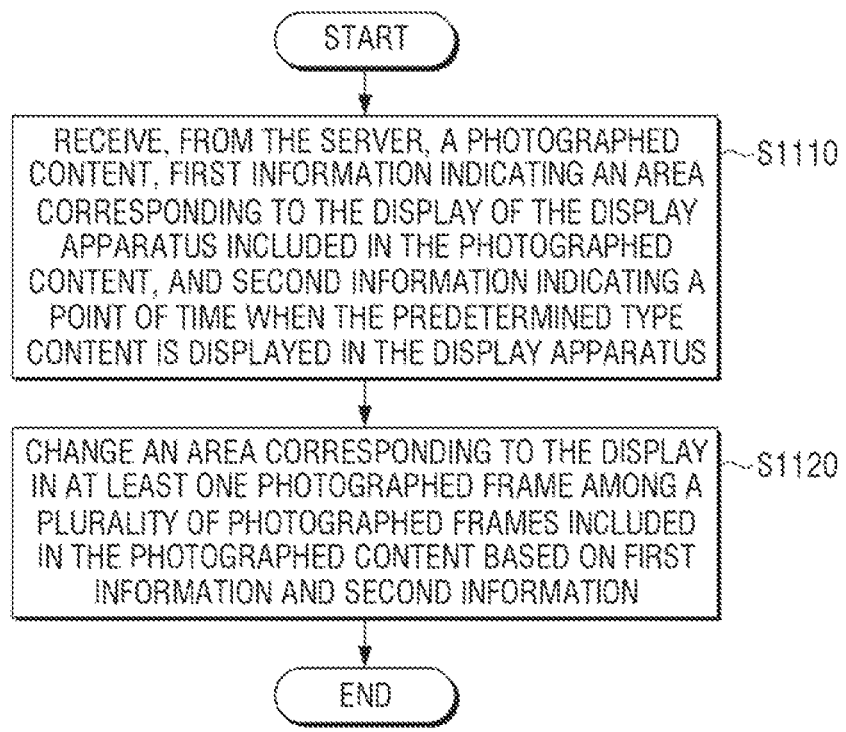
FIG. 11 is a flowchart of a method for controlling an electronic apparatus according to an embodiment.

FIG. 11 is a flowchart of a method for controlling an electronic apparatus according to an embodiment.

First, the photographed content, first information indicating an area corresponding to the display of the display apparatus included in the photographed content, and second information indicating the point of time when the predetermined type content is displayed are received from the server in operation S1110. The area corresponding to the display in at least one photographed frame among the plurality of photographed frames included in the photographed content is changed to other content based on the first information and the second information in operation S1120.

According to the various embodiments as described above, a display apparatus includes an identification frame in a content and displays the same and an area corresponding to a display may be easily identified from a photographed content, and a server or an electronic apparatus may change an identified area to other content.

The methods according to various embodiments as described above may be implemented as program that may be installed and executed in any electronic display apparatus.

The methods according to various embodiments as described above may be implemented by software upgrade or hardware upgrade for the any electronic display apparatus.

The various embodiments as described above may be performed through an embedded server provided in the electronic apparatus or an external server of the electronic apparatus.

According to the disclosure of the disclosure, various example embodiments as described above may be implemented with software including instructions stored in the machine-readable storage media readable by a machine (e.g., computer). According to one or more embodiments, an apparatus may read instructions from the storage medium and execute according to the read instructions. When an instruction is executed by a processor, the processor may perform functions corresponding to the instruction, either directly or under the control of the processor, using other components. The instructions may include a code generated by a compiler or executed by an interpreter. A machine-readable storage medium may be provided in the form of a non-transitory storage medium. Herein, the term "non-transitory" only denotes that a storage medium does not include a signal but is tangible, and does not distinguish the case in which a data is semi-permanently stored in a storage medium from the case in which a data is temporarily stored in a storage medium.

According to one or more embodiments of the disclosure, a method may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™). In the case of on-line distribution, at least a portion of the computer program product may be stored temporarily or at least temporarily in a storage medium such as a manufacturer's server, a server of an application store, or a memory of a relay server.

Each of the elements (for example, a module or a program) according to one or more embodiments may be comprised of a single entity or a plurality of entities, and some sub-elements of the abovementioned sub-elements may be omitted, the elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, at least some operations may be performed in a different order, omitted, or other operations may be added.

While various embodiments have been illustrated and described with reference to certain drawings, the disclosure is not limited to specific embodiments or the drawings, and it will be understood by those of ordinary skill in the art that various changes in form and details may be made therein without departing from the spirit and scope as defined, for example, by the following claims and their equivalents.

What is claimed is:

1. A display apparatus comprising:
a communicator;
a display; and
a processor configured to:
receive a content signal through the communicator, and
control the display to display a set of content frames based on the content signal and a plurality of identification frames including a predetermined image for identifying an area that corresponds to the display in a photographed image including the display,
wherein the processor is further configured to obtain a number of the plurality of identification frames based on a frame rate of the set of content frames.

2. The display apparatus of claim 1, wherein the processor is further configured to change a scanning speed of the display based on the frame rate of the set of content frames and the number of the plurality of identification frames.

3. The display apparatus of claim 1, wherein the processor is further configured to insert each of the plurality of identification frames between the set of content frames at a predetermined interval.

4. The display apparatus of claim 1, wherein the processor is further configured to:
place a first content frame among the set of content frames immediately succeeding an initially identified frame among the plurality of identification frames, and
place a last content frame among the set of content frames immediately preceding a last identification frame among the plurality of identification frames.

5. The display apparatus of claim 1, wherein the processor is further configured to control the display to display the set of content frames and the plurality of identification frames by placing at least one content frame among the set of content frames between a first identification frame including a first image for identifying an area that corresponds to the display in the photographed image including the display and a second identification frame including a second image for identifying an area that corresponds to the display in the photographed image including the display.

6. The display apparatus of claim 1, wherein the processor is further configured to change a part of content frames among the set of content frames to an identification frame including the predetermined image.

7. The display apparatus of claim 6, wherein the processor is further configured to change the part of content frames to the identification frame including the predetermined image by changing a pixel value of a predetermined area from each of the part of content frames.

8. The display apparatus of claim 1, wherein the set of content frames comprises an advertisement.

9. A server comprising:
a communication interface;
a memory storing a photographed content in which a display apparatus appears; and
a processor configured to:
identify a predetermined image from a plurality of photographed frames included in the photographed content,
obtain first information that indicates an area corresponding to a display of the display apparatus in the photographed content and second information that indicates a point of time when a predetermined type of content is to be displayed on the display of the display apparatus based on the predetermined image,
control the communication interface to transmit the photographed content, the first information, and the second information to an electronic apparatus,
identify a plurality of predetermined images in the plurality of photographed frames,
compare the predetermined image identified in each of the plurality of photographed frames to improve identification accuracy of the predetermined image, and
obtain the second information based on an initial predetermined image that is identified initially and a last predetermined image that is identified lastly among the plurality of predetermined images.

10. The server of claim 9, wherein the processor is further configured to change the predetermined type of content in the area corresponding to the display based on the first information in at least one photographed frame among the plurality of photographed frames based on the second information.

11. The server of claim 9, wherein the predetermined image is included in a plurality of identification frames among the photographed content, and at least one content frame among a plurality of content frames included in the photographed content is displayed while being disposed between the plurality of identification frames.

\* \* \* \* \*